US012392195B2

(12) United States Patent
Hendriks et al.

(10) Patent No.: US 12,392,195 B2
(45) Date of Patent: Aug. 19, 2025

(54) ASSEMBLY OF A MOTOR FOR A TUBE OF A SCREEN AND A SET OF ADAPTABLE PLUGS FOR ENGAGING THE INNER SURFACE OF THE TUBE

(71) Applicant: Coulisse B.V., Enter (NL)

(72) Inventors: Wouter Hendriks, Enschede (NL); Ike Essink, Wierden (NL); Jochem Andreas Nijland, Delden (NL)

(73) Assignee: Coulisse B.V., Enter (NL)

( * ) Notice: Subject to any disclaimer, the term of this patent is extended or adjusted under 35 U.S.C. 154(b) by 268 days.

(21) Appl. No.: 18/178,558

(22) Filed: Mar. 6, 2023

(65) Prior Publication Data

US 2023/0287737 A1 Sep. 14, 2023

(30) Foreign Application Priority Data

Mar. 8, 2022 (NL) ...................................... 2031190

(51) Int. Cl.
*E06B 9/50* (2006.01)
*E06B 9/68* (2006.01)

(52) U.S. Cl.
CPC . *E06B 9/50* (2013.01); *E06B 9/68* (2013.01)

(58) Field of Classification Search
CPC ................. E06B 9/50; E06B 9/68; E06B 9/72
See application file for complete search history.

(56) References Cited

U.S. PATENT DOCUMENTS 9,951,555 B2 4/2018 Klein Tuente
11,187,032 B2 * 11/2021 Buccola .................... E06B 9/44
2010/0078137 A1 * 4/2010 Angelini ................... E06B 9/72 160/311
2010/0200179 A1 * 8/2010 Di Stefano ............... E06B 9/42 160/368.1
2017/0081916 A1 * 3/2017 Greening .................. E06B 9/42
2018/0259033 A1 * 9/2018 Basutto ..................... E06B 9/17
2019/0100961 A1 * 4/2019 Kutell ....................... E06B 9/50
(Continued)

FOREIGN PATENT DOCUMENTS

DE 299 23 460 U1 11/2000
EP 2122104 B1 11/2012
EP 2 918 769 A1 9/2015
(Continued)

OTHER PUBLICATIONS

European Search Report in application No. EP 23 15 9581, dated Jul. 28, 2023.

*Primary Examiner* — Beth A Stephan
(74) *Attorney, Agent, or Firm* — Oppedahl Patent Law Firm LLC

(57) ABSTRACT

The invention relates to an assembly (1) of a motor (2) for a tube (101) of a screen and a set of plugs for engaging an inner surface of the tube. The set of plugs comprises a drive plug (10) for driving the tube, which drive plug is arranged to be connected to a drive shaft (3) of the motor. The set of plugs comprises a crown plug (30), which crown plug is arranged to be connected to an outer end of the motor for forming a first bearing at one end of the tube. The set of plugs comprises an end plug (20) arranged to be inserted into the tube at an opposite outer end of the tube for forming a second bearing, wherein each plug is provided with adapter means for adapting the outer diameter of the plug to the inner diameter of the tube.

14 Claims, 8 Drawing Sheets

(56) References Cited

U.S. PATENT DOCUMENTS

| | | | | |
|---|---|---|---|---|
| 2020/0165865 | A1* | 5/2020 | Buccola .................... | E06B 9/60 |
| 2023/0184031 | A1* | 6/2023 | Vanhoutte ................. | E06B 9/50<br>160/238 |

FOREIGN PATENT DOCUMENTS

| | | | |
|---|---|---|---|
| EP | 2933428 | A1 | 10/2015 |
| WO | WO2009109192 | A1 | 9/2009 |

* cited by examiner

ASSEMBLY OF A MOTOR FOR A TUBE OF A SCREEN AND A SET OF ADAPTABLE PLUGS FOR ENGAGING THE INNER SURFACE OF THE TUBE

The present invention relates to an assembly of a motor for a tube of a screen, for example a roller blind tube, and a set of plugs for engaging an inner surface of the tube, wherein the set of plugs comprises a drive plug for driving the tube, which drive plug is arranged to be connected to a drive shaft of the motor, wherein the set of plugs comprises a crown plug, which crown plug is arranged to be connected to an outer end of the motor for forming a first bearing at a first outer end of the tube, wherein the set of plugs comprises an end plug arranged to be inserted into the tube at a second outer end of the tube for forming a second bearing, wherein each plug is provided with adapter means for adapting the outer diameter of the plug to the inner diameter of the tube.

The assembly according to the invention provides the possibility to provide a universal motorized control for screen tubes. The plugs have adaptive outer dimensions that allow the assembly to be used for a wide variety of known screens having tubes with different dimensions. It is especially suitable as a retrofit kit to motorize any known roller blind system.

According to a preferred embodiment the adapter means comprise one or more engaging elements for engaging the inner surface of the tube that are movable between a minimal position in which the dimensions of the outer diameter of the plug are at a minimum and an extreme position in which the dimensions of the outer diameter of the plug are at a maximum. By using engaging elements, the optimal dimensions for the outer diameter of the plug can be easily set as only a few engaging elements suffice.

According to a first preferred embodiment the engaging elements are slidable over the plug and the adapter means further comprise pushing means to push the engaging elements radially outward towards the extreme position. Advantageously hereby a stepless adaptation of the dimensions of the plug outer diameter is achieved.

According to an elegant, preferred embodiment one or more of the plugs comprise a base part and a cover part that is slidable over the base part, wherein the cover part and the base part enclose the engaging elements and the cover part forms part of the pushing means. The integration of the engaging elements in the plug renders this embodiment compact and robust. The pushing cover part renders this embodiment suitable for plugs that are hard to access for a user, such as the drive plug and the end plug.

According to a practical preferred embodiment the pushing means further comprise pretensioning means, such as a spring. Preferably the adapter means further comprise operating means for the pretensioning means. In a first variant the pretensioning means are arranged to pretension the engaging elements in the minimal position and the operating means comprise retaining means that are arranged to retain the pretensioning means in a pressed position and the operating means are arranged to release the pretensioning means.

The first variant is perfectly suitable for the drive plug and allows a user to release the pretensioning means when the drive plug is at least partly inserted in the tube. The outer diameter of the drive plug will then automatically adapt to the inner diameter of the tube. In a second variant the operating means are arranged to move the engaging elements towards the extreme position against the force of the pretensioning means. In the second variant the operating means may comprise a suitable tool, such as a hex key or a screwdriver. The second variant is perfectly suitable for the end plug and allows a user to adapt the outer diameter of the end plug to the inner diameter of the tube when the end plug is at least partly inserted in the tube.

According to a second preferred embodiment the engaging elements are provided on one or more inserts and the adapter means comprise connection means for releasable connection of the inserts to the outer circumference of the plug in two or more different positions. The second embodiment is perfectly suitable for plugs that are accessible for a user, such as the crown plug.

In a first variant of the second preferred embodiment the inserts are open rings. The rings allow for a simultaneous connection of all engaging elements to the plug and consequently for a fast adaptation of the outer diameter of the plug to the inner diameter of the tube.

In a second variant of the second preferred embodiment, the inserts are pins. The position of the pins can be easily changed to adapt the outer diameter of the plug to the inner diameter of the tube. Several pins of different sizes can be provided.

In an optimal preferred embodiment, the engaging elements are provided with a ridge on top. Generally on the interior of many known screen tubes irregularities are present, such as seams or edges. The ridge provides a more universal fit and in general a better grip.

Preferably the adapter means comprise three engaging elements.

In a practical preferred embodiment the engaging elements are radially protruding ribs.

DESCRIPTION OF THE DRAWING

The invention will now be described in more detail with reference to the figures, in which.

The same components are designated in the different figures with the same reference numerals.

DETAILED DESCRIPTION

Figure 1:
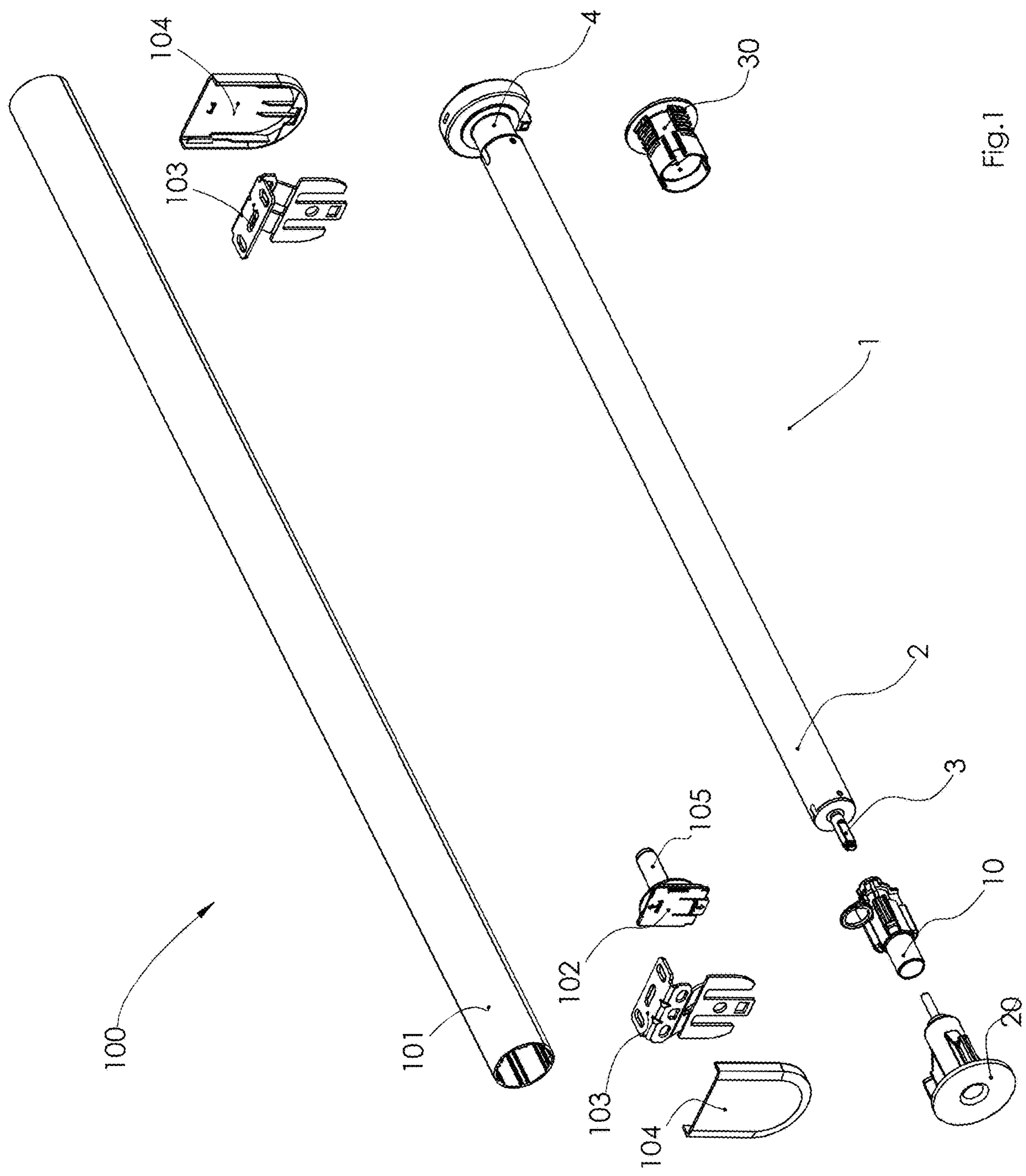
FIG. 1 shows a schematic view of a first preferred embodiment of an assembly according to the invention.

FIG. 1 schematically shows an exploded view of a preferred embodiment of an assembly 1 according to the invention to motorize any type of screen having a tube. As an example, a roller blind system 100 is shown having a roller blind tube 101 to which a flexible sheet member or roller curtain is to be attached in a conventional manner.

The assembly 1 comprises a tubular motor 2 and a set of plugs 10, 20, 30 for engaging the inner surface of the tube 101.

The set of plugs comprises a drive plug 10 for driving the tube, which is arranged to be connected to a drive shaft 3 at a first outer end of the tubular motor 2. The set of plugs comprises a crown plug or crown 30 that is arranged to be connected to a second outer end 4 of the tubular motor 2. In the embodiment shown the crown plug 30 could first be placed over the drive shaft 3 at the first outer end of the tubular motor 2 and could then be moved towards the second outer end 4. The tubular motor 2 provided with the drive plug 10 and preferably also provided with the crown 30 is to be inserted at one end of the tube 101, for example at the right end of the tube 101 in FIG. 1.

The set of plugs comprises an end plug 20 arranged to be inserted into the tube 101 at an opposite end of the tube 101, for example at the left end of the tube 101 in FIG. 1.

According to the invention the drive plug 10, the end plug 20 and the crown 30 are all provided with adapter means for adapting the outer diameter of the plug to the inner diameter of the tube 101.

Suitable devices for mounting the roller blind tube 101 on a surface, such as a wall, window frame or a ceiling, having releasably attachable mounting brackets and bracket connectors or shaft holders are known in the relevant field. Particularly suitable is a known device of the same applicant that is described in the abovementioned European patent application EP2933428, incorporated herein by reference.

Said known device comprises two bracket connectors 102 that are arranged to be attached at the outer ends of the roller blind tube 101. The bracket connectors 102 are arranged for releasable attachment to mounting brackets 103 for mounting the roller blind system on a surface. Optionally end caps 104 are mounted over the mounting brackets 103 in the mounted state of the roller blind system 101. One of the bracket connectors 102 is visible and provided with a bearing pin 105 for insertion in the end plug 20.

Figure 2A:
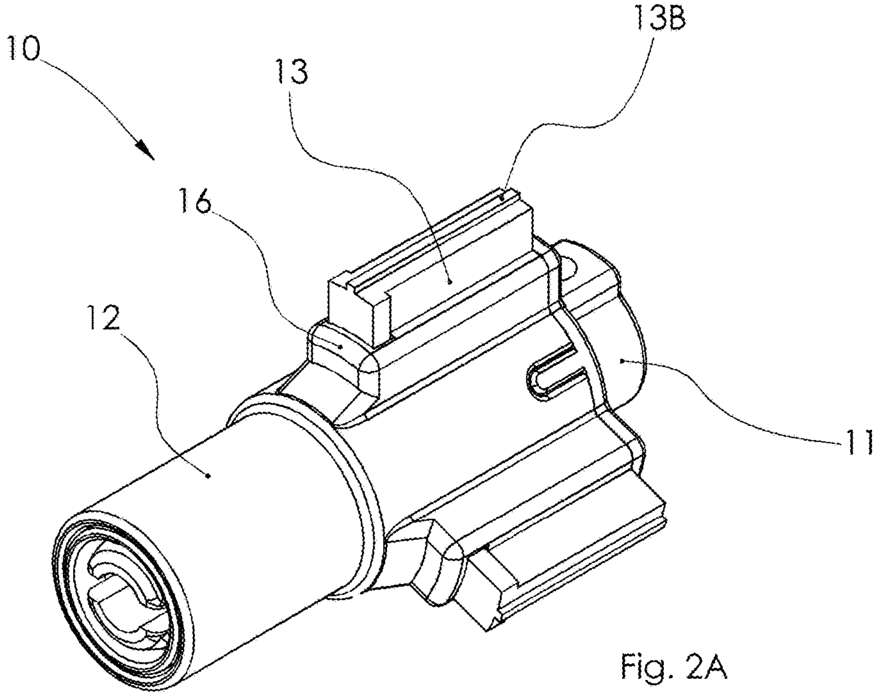
FIG. 2A shows a schematic view of an adaptable drive plug as part of the assembly of FIG. 1.
Figure 2B:
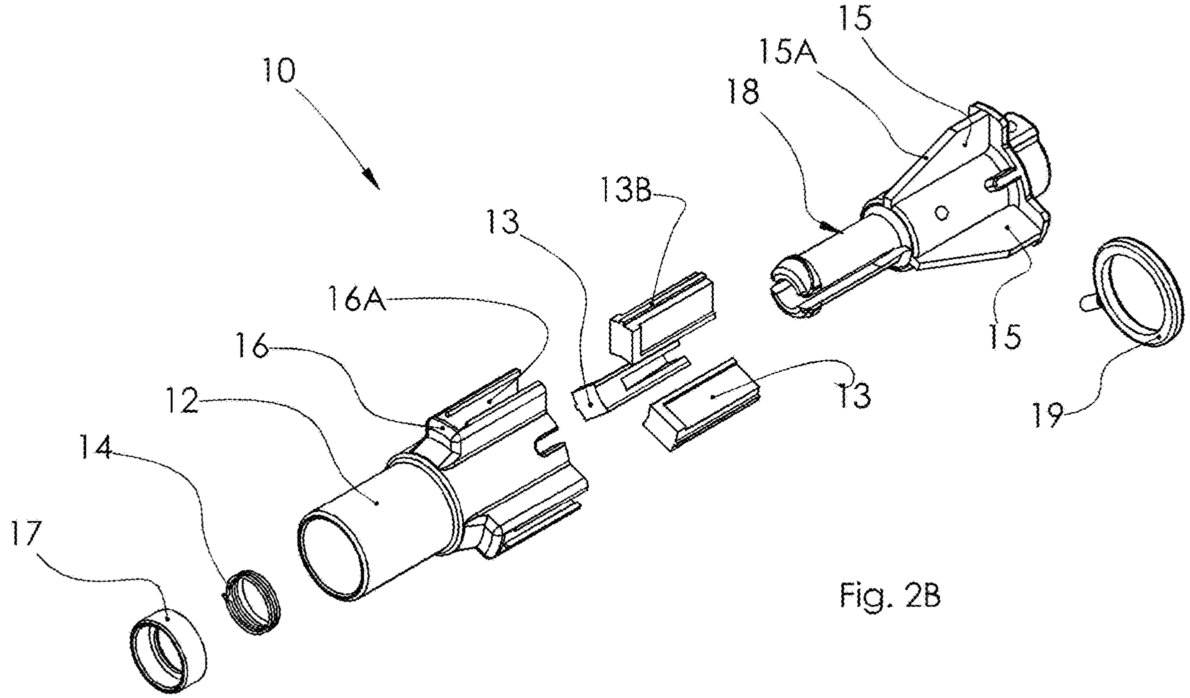
FIG. 2B shows the adaptable drive plug of FIG. 2A with exploded parts.
Figure 2C:
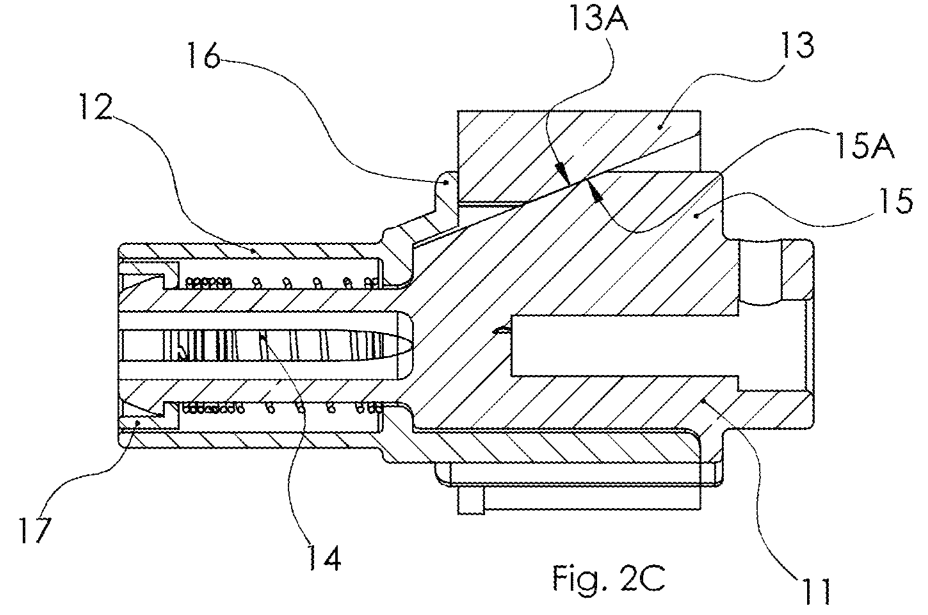
FIG. 2C schematically shows a longitudinal section through the adaptable drive plug of FIG. 2A.
Figure 2D:
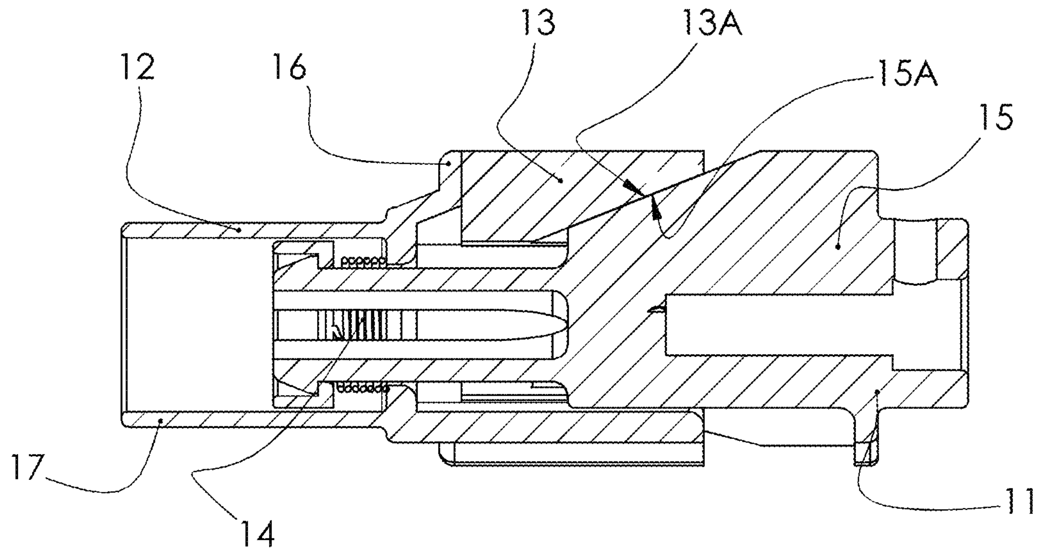
FIG. 2D schematically shows a longitudinal section through the adaptable drive plug in a different position.

FIGS. 2A, 2B, 2C and 2D show a preferred embodiment of the adaptable drive plug 10 in more detail. FIG. 2A shows a schematic view of the adaptable drive plug 10 in the extreme position in which the dimensions of the outer diameter of the drive plug 10 are at a maximum. FIG. 2B shows an exploded view of the adaptable drive plug 10. FIG. 2C schematically shows a cross section in longitudinal direction through the adaptable drive plug 10 in the extreme position shown in FIG. 2A. FIG. 2D schematically shows a cross section in longitudinal direction through the adaptable drive plug 10 in the minimal position in which the dimensions of the outer diameter of the drive plug 10 are at a minimum.

According to the invention the adaptable drive plug 10 comprises first adapter means that define the outer dimensions of the adaptable drive plug 10. In the preferred embodiment shown the first adapter means comprise a number of engaging elements, preferably ribs 13, that are movable over the outer circumference of the adaptable drive plug 10 between the minimal position and the extreme position.

The adaptable drive plug 10 comprises a base part 11 and a cover part 12 that is slidable over the base part 11 in longitudinal direction thereof. The cover part 12 and the base part 11 enclose the ribs 13. The adaptable drive plug 10 further comprises a spring 14 that is enclosed by the cover part 12 and the base part 11. The cover part 12 is arranged to push the ribs 13 over the base part 11 under the action of the spring 14 out of a minimal position towards an extreme position. In the preferred embodiment shown the cover part 12 comprises a number of longitudinal openings 16A to accommodate the ribs 13. Each longitudinal opening 16A has a short edge 16 that is arranged to abut against a short side of one of the ribs 13.

In the preferred embodiment shown the base part 11 is provided with a number of guiding elements, preferably wings 15, corresponding to the number of ribs 13. The ribs 13 have first, generally oblique guiding surfaces 13A and the wings 15 have second, generally oblique guiding surfaces 15A. The first and second guiding surfaces 13A, 15A are mating surfaces that facilitate sliding of the ribs 13 in a stepless manner between the minimal position (shown in FIG. 2D) and the extreme position (shown in FIG. 2C).

Preferably the ribs 13 are provided with ridges 13B to form the contact area with the inner surface of the tube 101.

In the preferred embodiment shown the number of ribs 13 and wings 15 is three. Preferably the ribs 13 lie substantially on an imaginary circle.

Figure 2E:
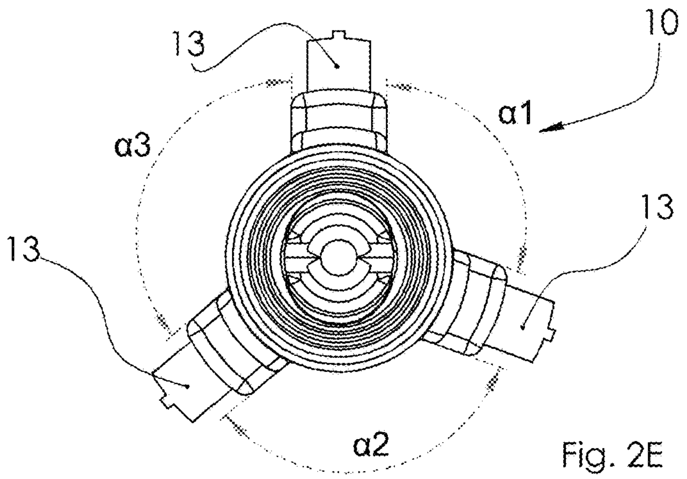
FIG. 2E shows a cross section through the adaptable drive plug of FIG. 2A.

In the preferred embodiment the ribs 13 are distributed unevenly over the circumference and the angles between adjacent ribs increase in clockwise direction. This can be seen in FIG. 2E showing a cross section through the adaptable drive plug 10 in the extreme position. Herein the angle $\alpha_1$ is substantially 110 degrees, the angle $\alpha_2$ is substantially 120 degrees and the angle $\alpha_3$ is substantially 130 degrees. An asymmetrical distribution of the ribs allows for finding a fit by rotating the adaptable plug in a tube having an irregular interior surface.

Figure 2F:
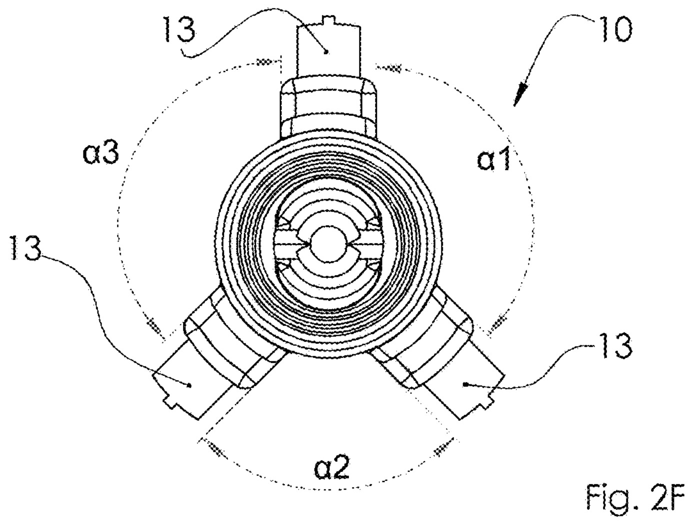
FIG. 2F shows a cross section through a first variant of the adaptable drive plug as part of the assembly according to the invention.

FIG. 2F shows a cross section through a first variant of the adaptable drive plug as part of the assembly according to the invention. Herein the angles $\alpha_1$ and $\alpha_3$ are substantially equal at substantially 135 degrees, whereas the angle $\alpha_2$ is substantially 90 degrees. The larger angles provide a larger fitting area.

Figure 2G:
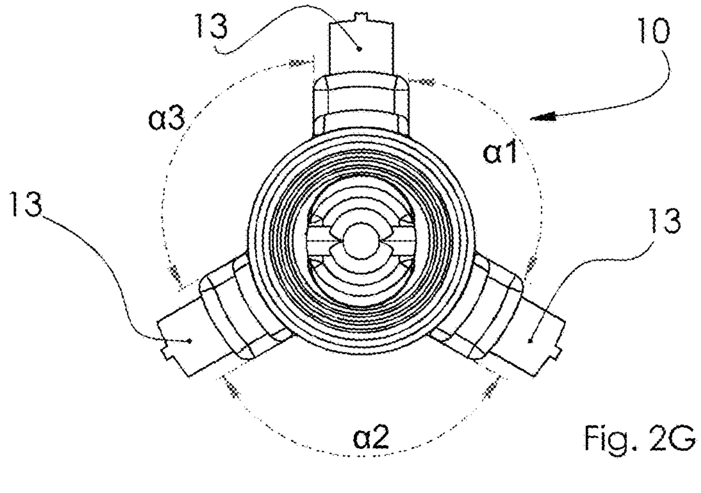
FIG. 2G shows a cross section through a second variant of the adaptable drive plug as part of the assembly according to the invention.

FIG. 2G shows a cross section through a second variant of the adaptable drive plug as part of the assembly according to the invention. In the second variant the ribs 13 are distributed substantially evenly over the circumference. The angles $\alpha_1$, $\alpha_2$ and $\alpha_3$ are substantially equal at substantially 120 degrees. A symmetrical distribution of the ribs works well with tubes having a smooth interior surface.

The base part 11 has a nose piece 18 for accommodating the spring 14. A locking ring 17 locks the spring 14 in place.

Preferably the spring 14 is arranged to pretension the cover part 22 in a direction towards the base part 21.

Preferably the adaptable drive plug 10 is provided with operating means for the spring that comprise retaining means that are arranged to retain the spring 14 in inwardly pressed position thereby allowing the adaptable drive plug 10 to assume the minimal position. In the minimal position the adaptable drive plug 10 can be easily inserted in the tube 101. In FIG. 2B a removable locking pin 19 is shown as an example of suitable retaining means. Once the retaining means release the spring 14, these will force the ribs 13 radially outwards until the ribs 13 engage with the inner surface of the tube 101. The adaptable drive plug 10 is then in a position to transfer the torque from the tubular motor 2 onto the tube 101.

Figure 3A:
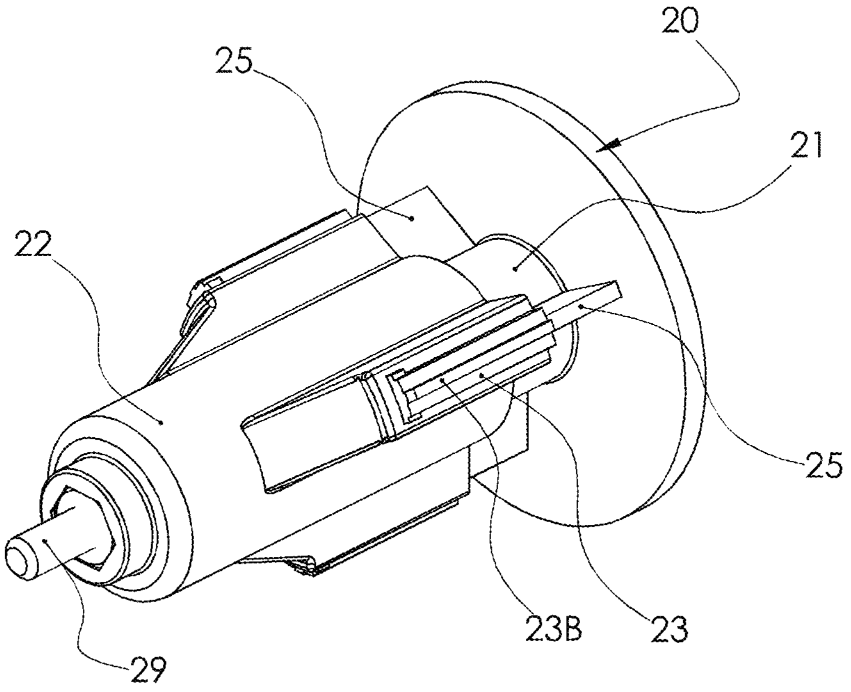
FIG. 3A shows a schematic view of an adaptable end plug as part of the assembly of FIG. 1.
Figure 3B:
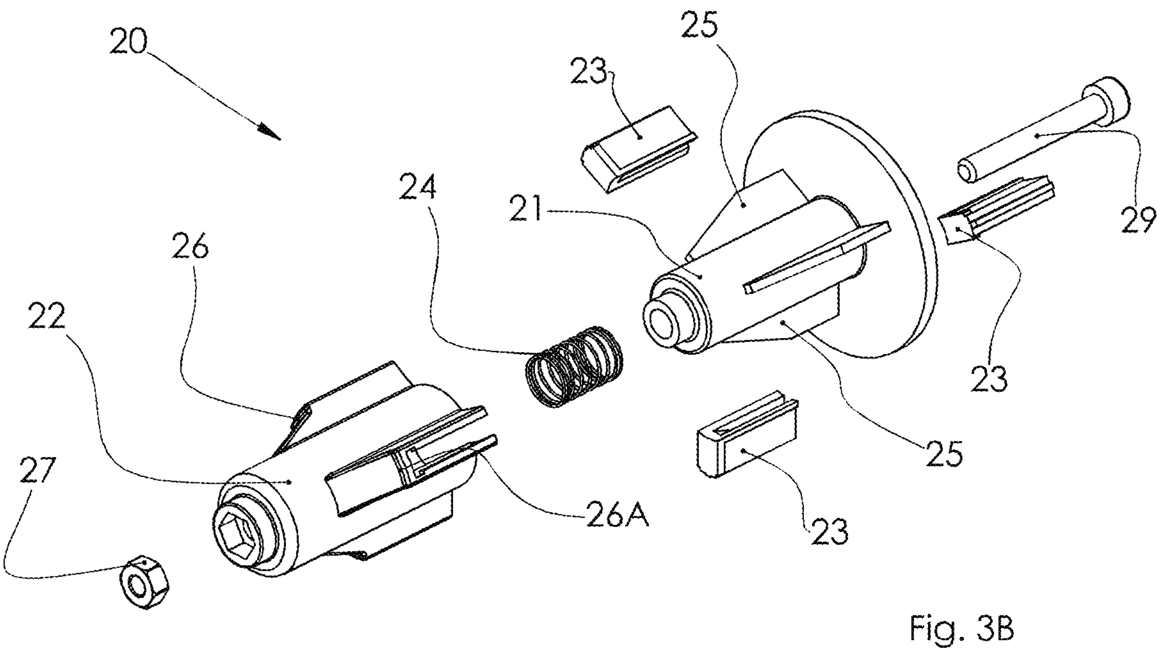
FIG. 3B shows the adaptable end plug of FIG. 3A with exploded parts.
Figure 3C:
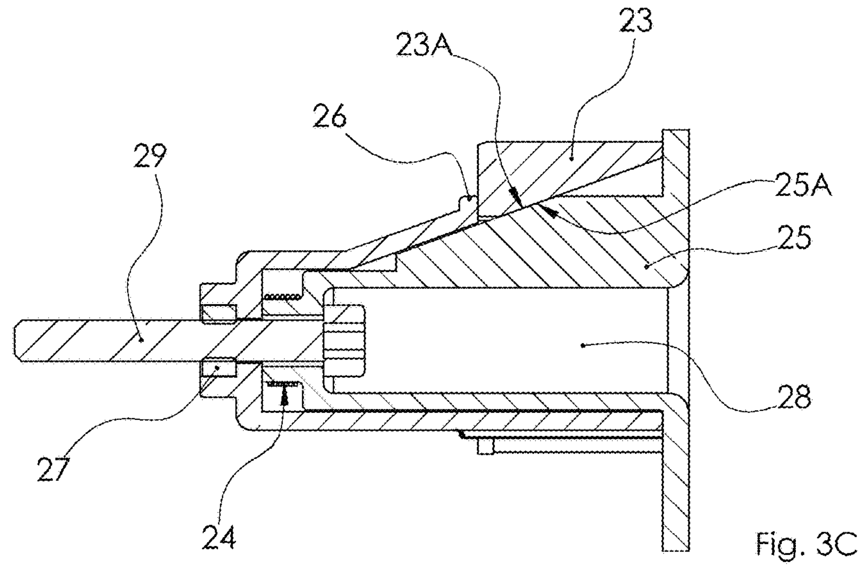
FIG. 3C schematically shows a longitudinal section through the adaptable end plug of FIG. 3A.
Figure 3D:
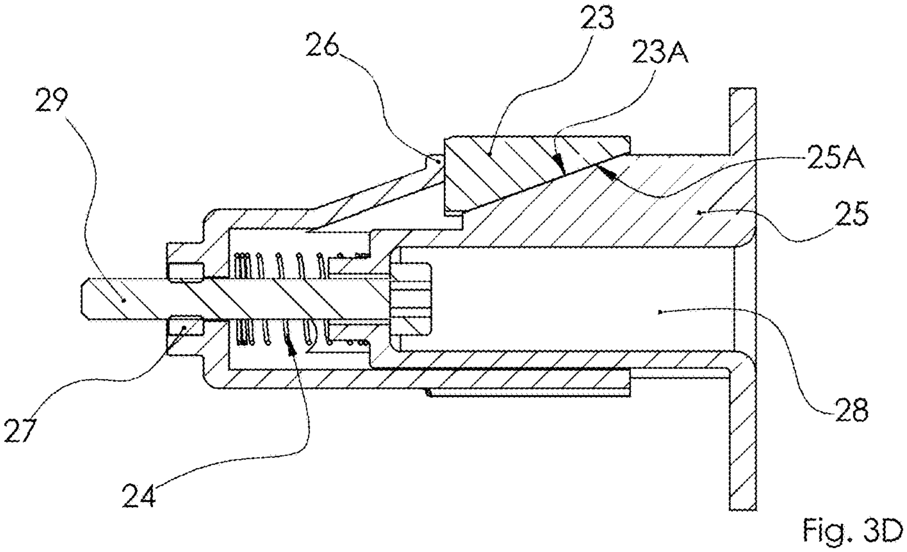
FIG. 3D schematically shows a longitudinal section through the adaptable end plug in a different position.

FIGS. 3A, 3B, 3C and 3D show a preferred embodiment of the adaptable end plug 20 in more detail. FIG. 3A shows a schematic view of the adaptable end plug 20 in an intermediate position. FIG. 3B shows an exploded view of the adaptable end plug 20. FIG. 3C schematically shows a cross section in longitudinal direction through the adaptable end plug in the extreme position. FIG. 3D schematically shows a cross section in longitudinal direction through the adaptable drive plug 10 in the position of FIG. 3A.

According to the invention the adaptable end plug 20 comprises second adapter means that define the outer dimensions of the adaptable end plug 20. In the preferred embodiment shown the second adapter means comprise a number of engaging elements, preferably ribs 23, that are movable over the outer circumference of the adaptable end plug 20 between the minimal position and the extreme position.

The adaptable end plug 20 comprises a base part 21 and a cover part 22 that is slidable over the base part 21 in longitudinal direction thereof. The cover part 22 and the base part 21 enclose the ribs 23. The adaptable end plug 20 further comprises a spring 24 that is enclosed by the cover part 22 and the base part 21. The cover part 22 is arranged to push the ribs 23 over the base part 21 by operating the bolt 29 against the action of the spring 24 out of a minimal position towards an extreme position (shown in FIG. 3C). In the preferred embodiment shown the cover part 22 comprises a number of longitudinal openings 26A to accommodate the ribs 23. Each longitudinal opening 26A has a short edge 26 that is arranged to abut against a short side of one of the ribs 23.

In the preferred embodiment shown the base part 21 is provided with a number of guiding elements, preferably wings 25, corresponding to the number of ribs 23. The ribs 23 have first, generally oblique guiding surfaces 23A and the wings 25 have second, generally oblique guiding surfaces 25A. The first and second guiding surfaces 23A, 25A are mating surfaces that facilitate sliding of the ribs 23 in a stepless manner between the minimal position and the extreme position.

Preferably the ribs 23 are provided with ridges 23B to form the contact area with the inner surface of the tube 101. Preferably the number of ribs 23 and wings 25 is three.

Figure 3E:
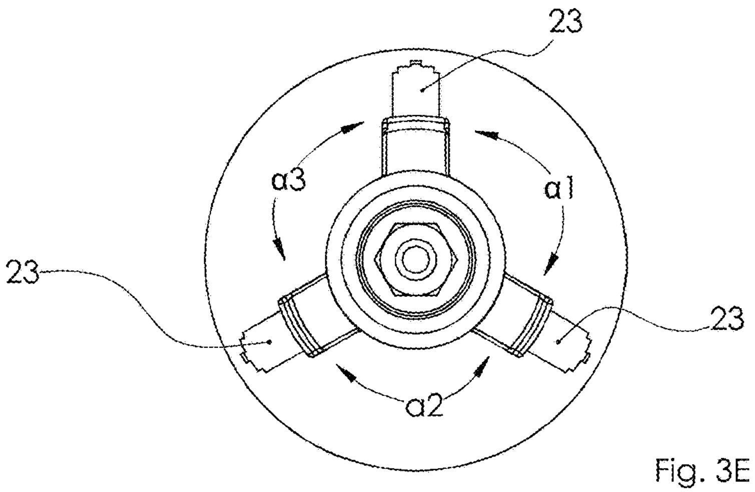
FIG. 3E shows a cross section through the adaptable end plug of FIG. 3A.

FIG. 3E shows a cross section through the adaptable end plug 20 in the position of FIG. 3A. In the preferred embodiment shown the ribs 23 are distributed substantially symmetrically over the circumference of the end plug. The angles $\alpha_1$, $\alpha_2$ and $\alpha_3$ are substantially equal at substantially 120 degrees and lie substantially on an imaginary circle. As an alternative an asymmetrical distribution of the ribs 23 is possible, for example one of the distributions shown in FIGS. 2E and 2F for the ribs of the drive plug.

The base part 21 has an inner space 28 for accommodating the spring 24. The inner space 28 is accessible by operating means, for example a bolt 29 that cooperates with a nut 27 to press or release the spring 24 and thereby change the position of the cover part 22 and the ribs 23.

Preferably the adaptable end plug 20 is first brought in the minimal position in which it can be easily inserted in the tube 101. Preferably the spring 24 is arranged to pretension the cover part 22 in a direction away from the base part 21. The operating means can be used to press the spring 24 inwards thereby forcing the ribs 23 radially outwards until the ribs 23 engage with the inner surface of the tube 101. The adaptable end plug 20 is then in a position to hold the tube 101.

Figure 4A:
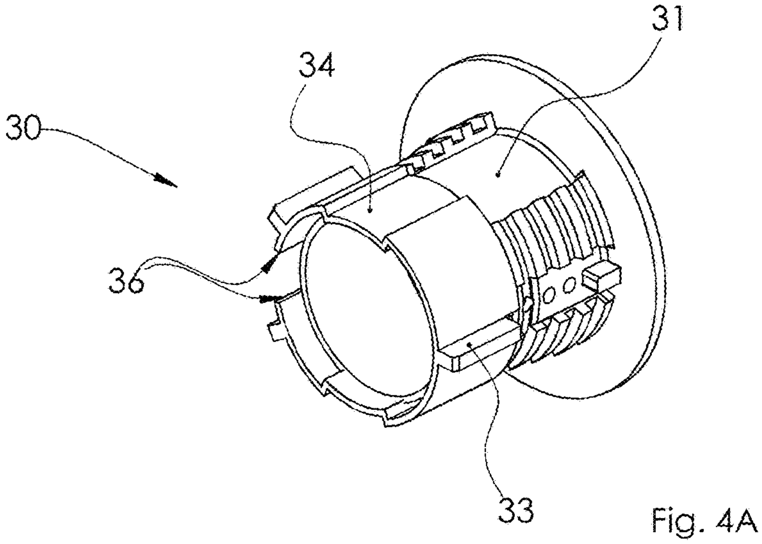
FIG. 4A shows a schematic view of a first preferred embodiment of an adaptable crown plug as part of the assembly of FIG. 1.
Figure 4B:
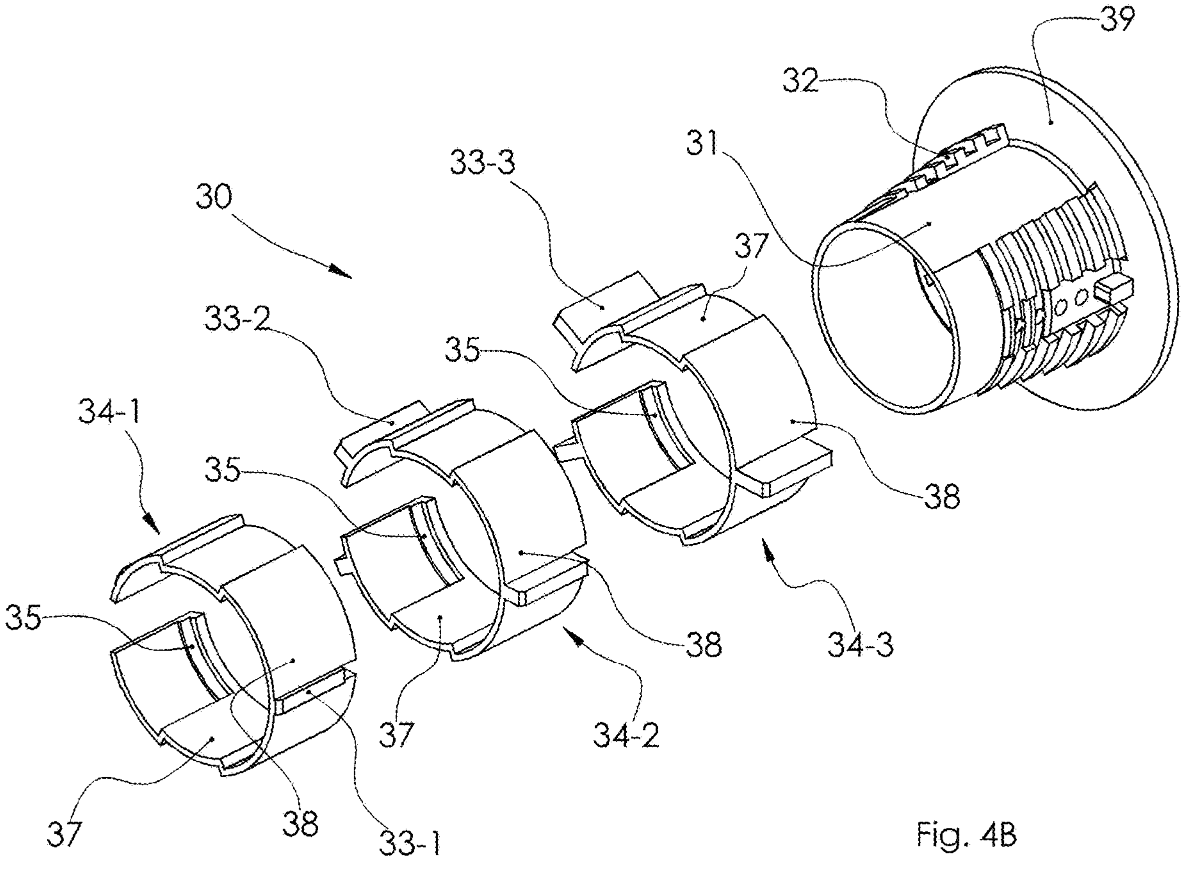
FIG. 4B shows the adaptable crown plug of FIG. 4A with exploded parts.

FIG. 4A shows a schematic view of a first preferred embodiment of an adaptable crown plug 30 as part of the assembly of FIG. 1. FIG. 4B shows the adaptable crown plug 30 with exploded parts.

According to the invention the adaptable crown plug 30 comprises third adapter means that define the outer dimensions of the adaptable crown plug 30. The third adapter means comprise a number of engaging elements, preferably ribs 33, that can be moved between a minimal position in which the dimensions of the outer diameter of the crown plug 30 are at a minimum and an extreme position in which the dimensions of the outer diameter of the crown plug 30 are at a maximum. The engaging elements are provided on one or more inserts for releasable connection to the outer circumference of the plug.

In the first preferred embodiment the insert is a ring 34 provided with engaging elements formed by a number of radially outwardly protruding ribs 33. The crown plug 30 comprises a tube part 31 and a flange part 39. The ring 34 comprises connection means for releasable connection of the ring 34 in different positions on the tube part 31 the crown plug 30. The connection means preferably comprise mating grooves 32 and tongues 35 that extend in circumferential direction over the outer surface of the tube part 31 of the crown plug 30 and over the opposing inner surface of the ring 34. The ring 34 is open and the outer ends 36 of the ring 34 pre-clamp towards each other.

Preferably a set of rings, for example rings 34-1, 34-2, 34-3, is provided having ribs 33-1, 33-2, 33-3 of different heights. The rings allow for a simultaneous connection of all engaging elements to the plug and consequently for a fast adaptation of the outer diameter of the plug to the inner diameter of the tube.

Preferably rows of grooves 32, each having a different depth, are provided on the tube part 31. As such a stepwise adaptation of the outer dimensions of the crown plug 30 to the inner dimensions of the tube can be accomplished. The connection means preferably further comprise first and second ring segments 37 and 38 having different inner diameters. The first ring segments 37 fit between the rows of grooves 32, whereas the second ring segments 38 fit over the rows of grooves 32.

Figure 5A:
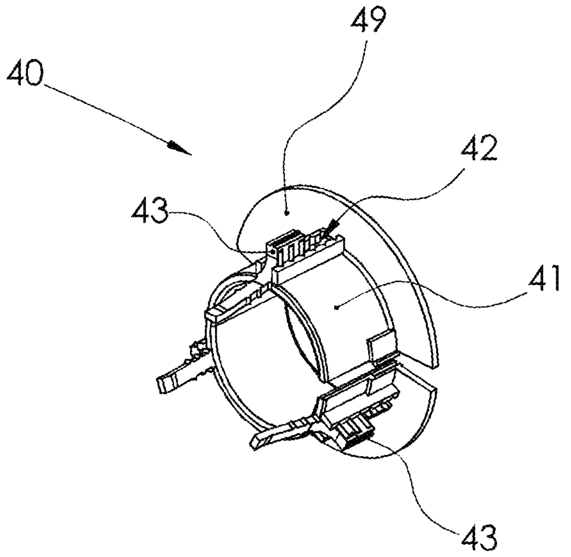
FIG. 5A shows a schematic view of a second preferred embodiment of an adaptable crown plug as part of the assembly according to the invention.
Figure 5B:
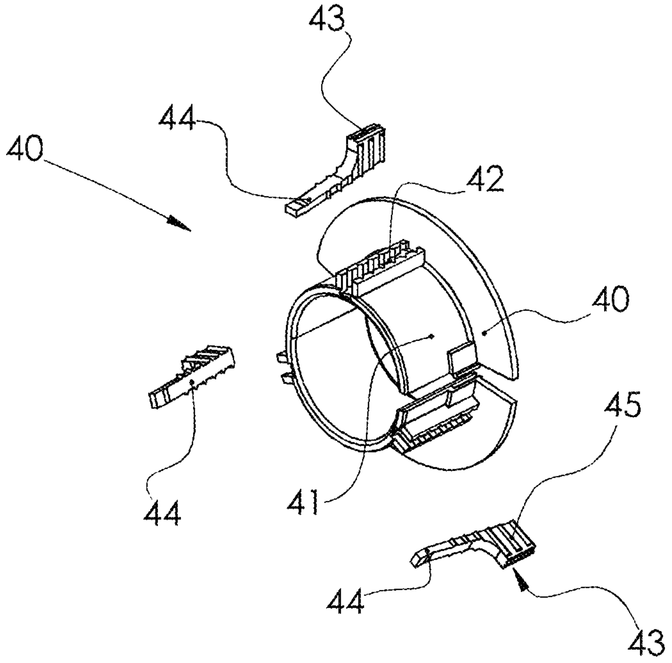
FIG. 5B shows the adaptable crown plug of FIG. 5A with exploded parts.

FIG. 5A shows a schematic view of a second preferred embodiment of an adaptable crown plug 40 as part of the assembly according to the invention. FIG. 5B shows the adaptable crown plug 40 with exploded parts.

In the second preferred embodiment the inserts are sets of pins 44, wherein each pin is provided with a radially outwardly protruding rib 43. Preferably different sets of pins are provided having ribs of different heights. The crown plug 40 comprises a tube part 41 and a flange part 49. The tube part 41 and the pins 44 comprise connection means for releasable connection of the pins 44 in different positions on the tube part 41. The connection means preferably comprise mating grooves 42 and tongues 45 that extend in radial direction from the tube part 41 of the crown plug 40 and over the opposing sides of the pins 44.

Preferably the grooves 42 are arranged in rows, wherein adjacent grooves in a row have different depths. As such a stepwise adaptation of the outer dimensions of the crown plug 40 to the inner dimensions of the tube can be accomplished.

The invention follows from the inventive thought to provide a universal assembly for motorizing a large number of roller blind systems of different manufacturers. The use of adapter means, with either integrated or releasably connectable engaging elements, which can assume varying radial positions on the plug to adapt the outer diameter of the plug to the inner diameter of the tube, makes the universal assembly very suitable for the aftermarket.

The invention is of course not limited to the described and shown preferred embodiments but extends to any embodiment falling within the scope of protection as defined in the claims and as seen in the light of the foregoing description and accompanying drawings.

The invention claimed is:

1. An assembly of a motor for a tube of a screen, the assembly comprising a set of plugs for engaging an inner surface of the tube, wherein the set of plugs comprises a drive plug for driving the tube, the drive plug is arranged to be connected to a drive shaft of the motor, wherein the set of plugs comprises a crown plug, the crown plug is arranged to be connected to an outer end of the motor for forming a first bearing at a first outer end of the tube, wherein the set of plugs comprises an end plug arranged to be inserted into the tube at a second outer end of the tube for forming a second bearing, wherein each of the plugs has an outer diameter having dimensions and each of the plugs is provided with adapter means that define the dimensions of the outer diameter for adapting the outer diameter of the plug to the inner diameter of the tube, wherein the adapter means comprise one or more engaging elements for engaging the inner surface of the tube that are movable between a minimal position in which the dimensions of the outer diameter of the plug are at a minimum and an extreme position in which the dimensions of the outer diameter of the plug are at a maximum.

2. The assembly according to claim 1, wherein the screen is a roller blind.

3. The assembly according to claim 1, wherein the engaging elements are slidable over the plug and the adapter means further comprise pushing means to push the engaging elements radially outward towards the extreme position.

4. The assembly according to claim 3, wherein one or more of the plugs comprise a base part and a cover part that is slidable over the base part, wherein the cover part and the base part enclose the engaging elements and the cover part forms part of the pushing means.

5. The assembly according to claim 3, wherein the pushing means further comprise pretensioning means, such as a spring.

6. The assembly according to claim 5, wherein the adapter means further comprise operating means for the pretensioning means.

7. Assembly according to claim 6, wherein the pretensioning means are arranged to pretension the engaging elements in the extreme position and the operating means comprise retaining means that are arranged to retain the pretensioning means in a pressed position and the operating means are arranged to release the pretensioning means.

8. The assembly according to claim 6, wherein the operating means are arranged to move the engaging elements towards the extreme position against the force of the pretensioning means.

9. The assembly according to claim 1, wherein the engaging elements of at least one of the plugs are provided on one or more inserts and the adapter means comprise connection means for releasable connection of the inserts to the outer diameter of the plug in two or more different positions.

10. The assembly according to claim 9, wherein the inserts are open rings.

11. The assembly according to claim 9, wherein the inserts are pins.

12. The assembly according to claim 1, wherein the adapter means comprise three engaging elements.

13. The assembly according to claim 1, wherein the engaging elements are provided with a ridge on top.

14. The assembly according to claim 1, wherein the engaging elements are radially protruding ribs.

* * * * *